Sept. 21, 1948.    R. J. McNITT    2,449,856
APPARATUS FOR REGULATING THE TRANSFER OF
HEAT IN FUSED BATH ELECTROLYTIC CELLS
Filed July 11, 1941
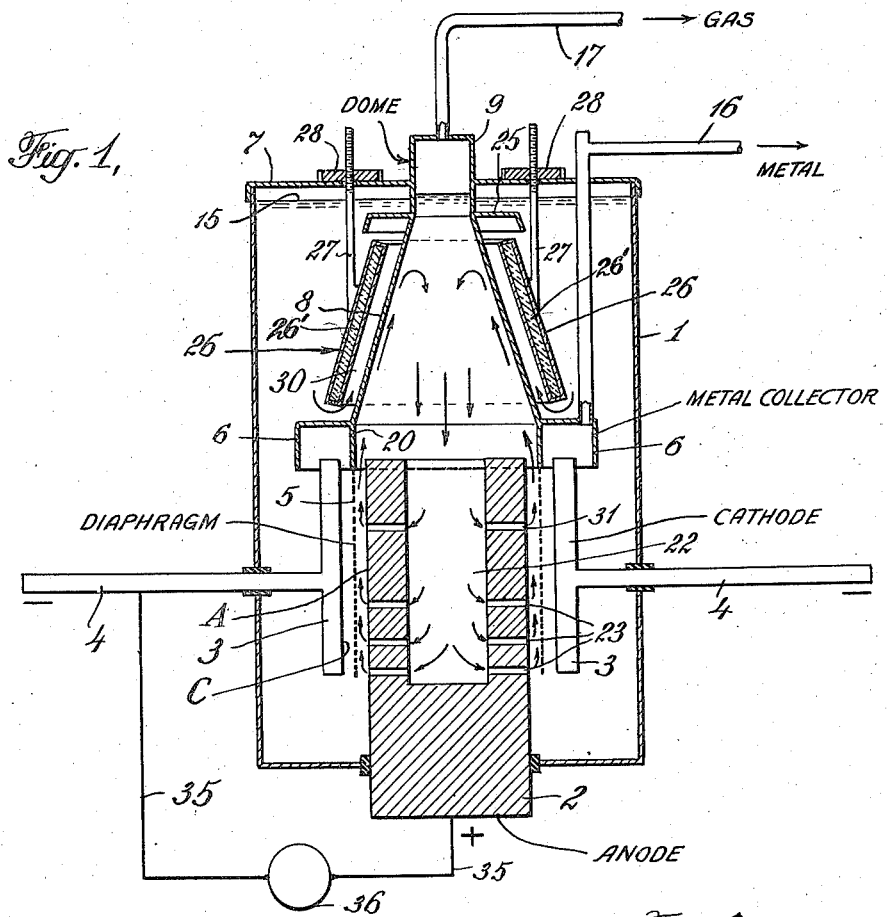
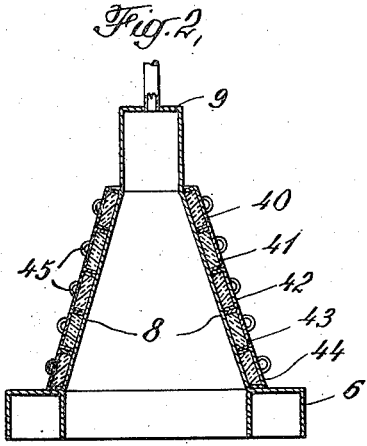
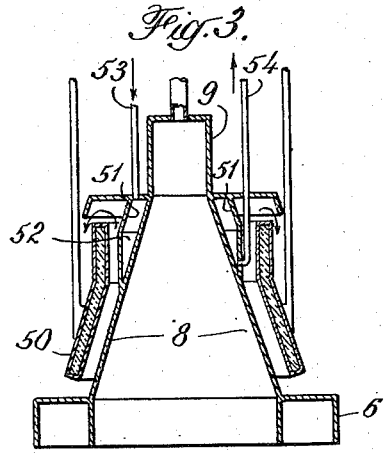
INVENTOR
ROBERT J. McNITT,
BY
Pennie, Davis, Marvin & Edmonds
ATTORNEYS Patented Sept. 21, 1948

2,449,856

UNITED STATES PATENT OFFICE 2,449,856

APPARATUS FOR REGULATING THE TRANSFER OF HEAT IN FUSED BATH ELECTROLYTIC CELLS

Robert J. McNitt, Perth Amboy, N. J.

Application July 11, 1941, Serial No. 401,891

4 Claims. (Cl. 204—247)

This invention relates to the electrolysis of fused salt baths in cells of the general type which have the lower part of the active anode surface so located in the bath it is subject to chilling caused by a loss of heat. Such cells generally have either the lower part of the active anode surface extending to a point near the bottom of the cell, or the electrical conductors inserted through the lower portion of the cell, as through the bottom or the lower side walls, or both.

Due to the fact that cool fused electrolyte is more dense and has a higher electrical resistance than hot electrolyte, there is a natural tendency for the cool electrolyte to settle around the lower parts of the electrode surfaces and reduce the flow of electric current between the lower parts of these surfaces. Furthermore, the conductors which feed electric current to the electrodes conduct a considerable amount of heat away from the electrode surfaces, and when these conductors pass through the bottom or lower side walls of the cell, there is a tendency to form films of frozen electrolyte on the lower parts of the electrode surfaces, resulting in an increase in the electrical resistance causing a reduction in the flow of electric current.

On account of these natural tendencies, it has been found necessary to supply a high density of current flow between the electrodes, resulting in a high cell voltage and waste of electrical energy with the formation of a great deal of heat which must be dissipated. Attempts to lower the cell voltage by extending the electrode areas upward were futile as the lower surfaces became inactive unless the current was increased to the point where the current density and cell voltage became the same as originally.

A new cell operates with higher energy efficiency than an old cell and requires a greater flow of electric current between its electrodes to prevent the lower electrode surfaces from becoming cold and relatively inactive. It is customary to operate many cells in series electrical connection and the electric current which flows through the series circuit must be of sufficient intensity to satisfy the demands of the cell which is the coldest cell in the circuit. There are larger energy losses in the cells having the worn electrodes, and these losses increase with the deteriorating condition of the electrodes due to corrosion and erosion.

The term "new cell," as used herein, means a cell having perfect electrodes, such as new electrodes, and a bath of electrolyte in which there is no accumulation of impurities. As the cell is used and the active surface of the anode loses its original form due to corrosion and erosion and there is an accumulation, more or less, of impurities in the bath, the energy efficiency of the cell decreases and there is an increasing generation of heat which must be dissipated.

From time to time it is necessary to interrupt the flow of electric current in a cell for the purpose of making replacements and adjustments and, during such interruptions, the bath in contact with the electrodes may decrease in temperature to a point where a layer of frozen electrolyte may form on the lower surfaces of the electrodes. In order to restore the lower electrode surfaces to normal activity, it is necessary that the normal electric current flowing through the series circuit be considerably greater than would be required if there were no interruptions in the flow of current and the series current is adjusted to meet the demand of the most efficient and coldest cell. Thus, there is a further continuous loss of electrical energy in all cells on this account.

As the cell becomes older and less efficient, the heat generated by the increasing loss of electrical energy is difficult to dissipate, and to avoid damage to the cell, a portion of the series current is shunted around the cell through water cooled rheostats. Because the current in the series circuit is greater on account of the demand of the new and coldest cell, this inefficient expedient must be applied earlier in the life of the cell than would otherwise be necessary and results in a substantial loss in production, as well as increased loss of electrical energy.

It is an object of this invention to provide an improved construction and arrangement of electrolytic cell for increasing the efficiency of the process, particularly when the cell is one of a plurality of cells supplied with current in a series circuit. The increased efficiency of the cell when constructed and operated in accordance with the invention is exemplified by a lower current density, as measured in amperes per unit area of the electrode surface, and a lower cell voltage resulting in lower electrical energy input for every pound of metal produced.

I attribute the improved efficiency resulting from the invention to the maintenance of normal activity with the lower current density, and by that, I mean the normal activity of the lower part of the active anode surface. I believe that the high current density and corresponding high energy losses aforementioned are due to the failure to circulate a hot stream of electrolyte from the upper part of the anode compartment to the lower part of the anode and in the failure to promptly apply additional electric current to a cell after it has suffered an interruption in flow of current, in order to melt away from the lower surface of the anode, films and crusts of frozen electrolyte and to remove from the passages through which the anode stream should circulate near the bottom of the anode, obstrutcions of congealed electrolyte which were formed during the interruption in current flow. It is an object of this invention to maintain normal activity at the lower anode surface, and by that, I mean maintaining this surface and the electrolyte between the lower part of the electrodes in such condition that the lower part of the anode will carry its proportionate share of electric current, and in certain cases where it is advantageous to have the anode serve as a scavenger, the lower anode should be able to combine with oxygen set free at its active surface.

The invention aims to provide an improved cell for the electrolysis of a fused salt bath in which a stream of electrolyte flows upward along the active anode surface and involves controlling the temperature of electrolyte as it flows upward from the active anode surface. In one advantageous embodiment of the invention in which the stream of electrolyte from the anode flows upward into the bath and returns to the zone of electrolytic action, the dissipation of heat from the rising stream is suppressed, thereby returning electrolyte at a higher temperature than would ordinarily result. In a more or less complete aspect of the invention, the dissipation of heat from the anode stream is controlled in accordance with the condition of the cell, and comprises suppressing the dissipation of heat from the anode stream of a new cell to maintain the anode stream at a high temperature, and increasing the dissipation of heat from the anode stream as the cell becomes old and the anode worn due to corrosion and erosion, to prevent overheating of the cell.

In operating a cell of my invention, I may add heat from an outside source to the electrolyte to increase the temperature of the stream which flows in contact with the active electrode surfaces. To this end, I may circulate a heated fluid through the bath, for example molten sodium in a suitable unit, preferably located in a portion of the flowing stream. I may also circulate a fluid at a lower temperature than the bath to absorb heat from the anode stream and carry it to the outside of the cell, especially in old cells where a large dissipation of heat is desirable.

In another embodiment of the invention, I may supply a quantity of electricity to the electrodes in addition to that provided by the series circuit to increase for a short time the current density in one cell, thereby forcing more current to the lower anode surface to melt away congealed masses of electrolyte, reestablish circulation of the anode stream and render the anode surface normally active.

In an advantageous arrangement of apparatus of the invention, I use a cell in which the electrodes are in the lower portion thereof, which has a considerable depth of charge above the active surfaces of the electrodes, a diaphragm between the active surfaces, and an anode compartment extending upward from the active anode surface, the upper part of which compartment is separated from the remaining portion of the bath by means of a partition. The partition is so located that the stream of electrolyte which flows upward along the active anode surface, and between the anode and the diaphragm, enters the upper part of the anode compartment and flows along the partition. Means are provided to control the dissipation of heat from the stream of electrolyte flowing along the partition, for example by suppressing the dissipation of heat, thereby permitting the stream to remain at a high temperature, or by increasing the dissipation of heat, thereby decreasing the temperature of the stream of electrolyte.

In a particularly advantageous construction of cell, an anode is used which has a large central opening communicating with the bath in the upper anode compartment and a plurality of passageways, such as holes or slits, connecting the central opening with the space between the active anode surface and the diaphragm. The anode stream of electrolyte flows upward past the active anode surface into the upper part of the anode compartment and returns to the central opening in the anode from which it flows through the passages into the space between the active anode surface and the diaphragm. The upper anode compartment is separated from the remaining part of the bath by a partition which extends up through the surface of the bath. A suitable thermal barrier in the form of an insulated wall is mounted outside the partition and is arranged to control the dissipation of heat from the stream flowing along the partition in the upper anode compartment. The insulated wall is preferably adjustably mounted and positioned to act as a baffle and control the flow of the bath outside the anode compartment to which the heat is transferred from the anode stream.

The apparatus of the invention may be employed to control the temperature of the anode stream during the various stages in the life of the cell from the time when the cell is new, requiring the retention of heat in the electrode stream to the time when the cell has become old and the anode has deteriorated due to erosion and corrosion and requires much dissipation of heat from the electrode stream to prevent overheating of the cell.

By way of illustration I shall describe the application of my invention to the electrolytic production of sodium and chlorine from a fused mixed bath of sodium chloride with a suitable fluxing agent, such as calcium chloride. The invention, however, is applicable to the electrolysis of other types of salt baths.

In the drawings:

Fig. 1 shows a vertical section taken through the center of a cell embodying the invention, and Figs. 2 and 3 show vertical central sections of modified constructions of the upper part of an anode compartment.

Referring to Fig. 1, the cell comprises a steel container 1, a cylindrical carbon anode 2, an annular steel cathode 3 having its active surface C concentric with the active surface A of the anode and supported from the cell wall by arms 4 which also serve to conduct electric current from the cathode to the outside of the cell. A perforated metal diaphragm 5 is placed concentric with the active cathode surface and is supported from the steel metal collector hood 6 which is in turn supported from the cover 7 of the cell by rods (not shown). Continuing from the top of the collector hood 6, the conical wall or partition 8 extends upward and connects with dome 9.

The cell is filled with the fused bath up to the level 15 and upon the application of electric current between the electrodes liquid sodium rises from the cathode, and collecting under hood 6, flows out of the cell through duct 16, while chlorine gas rises through the bath into dome 9 and is discharged through duct 17.

That part of the cell which extends from the bottom of the active surface of the anode to the upper surface of the bath and is confined within the perforated diaphragm 5, the interior wall 20 of collecting hood 6, the partition 8 and dome 9 will be designated as the anode compartment, and that part which extends between the top of the active surface of the anode and the upper surface of the bath will be designated as the upper part of the anode compartment. The anode 2 has a large central opening 22 beneath the upper anode compartment and a number of holes or slits 23 connecting the central opening with the space between the anode and the diaphragm.

A steel flange 25 surrounds the base of dome 9 and is welded thereto. A conical baffle 26 spaced from and surrounding the partition 8 is suspended from the rods 27 which pass up through the cover. This baffle is preferably formed of double steel walls having a gas-tight closure at the top and a gas-pervious closure at the bottom. The space between the walls is filled with a thermal insulating material 26' such as a gas or diatomaceous earth, thereby giving the baffle the additional function of a thermal barrier. The rods 27 are adjustably secured by screw threads operated by the wheels 28 and the baffle or thermal barrier may be raised and lowered to any desired position.

When the passages 23 are obstructed with frozen electrolyte, as for example when there has occurred an exceptionally long interruption in the flow of electric current to the cell, I may provide a supplemental electrical circuit 35 and any suitable source of current, such as the generator 36, to supply more current into that particular cell than is provided by the series circuit supplying all of the cells in the circuit. By means of this circuit, I may add more current to the coldest cell only, until the circulation of the anode stream to the bottom of the anode surface is restored in that cell.

A large part of the heat liberated by the passage of the electric current between the electrodes appears in the electrolyte between the diaphragm and the active anode surface. The chlorine set free at this surface forces the hot electrolyte to flow in the form of a stream into the upper part of the anode compartment and along the partition 8 as shown by the arrows. The stream makes a loop and flows into the hollow center 22 of the anode as shown by the arrows. It then flows through the holes 23 into the space between the diaphragm and anode and repeats the circulation just described.

In carrying out an operation in a cell as illustrated in Fig. 1, the cell is filled to the level 15 with a molten bath of sodium chloride and calcium chloride. Assuming that the electrodes are fairly well eroded and corroded, requiring a considerable dissipation of heat from the cell, the thermal barrier or baffle 26 is set in the position shown. When baffle 26 is placed midway between flange 25 and the top of hood 6, as shown in Fig. 1, the electrolyte outside of the anode compartment circulates rapidly upward in the passage 30 between the baffle and the partition 8 as indicated by the arrows, and there is a maximum dissipation of heat from the anode stream of electrolyte flowing upward along the partition 8 in the upper part of the anode compartment. The bath outside the anode compartment is cooler than the bath in the anode stream and the heat flows into it. By throttling the flow of steam in space 30 a control over the dissipation of heat from the anode stream may be effected. This dissipation of heat diminishes as the baffle 26 is raised and reaches a minimum when the baffle is raised against flange 25 shutting off the flow of the bath in space 30.

In view of the thermal insulation in the baffle, the electrolyte in space 30 reaches a temperature approaching that of the anode compartment when the stream in space 30 is throttled or stopped and the dissipation of heat from the anode stream is greatly minimized. If the heat is prevented from escaping from the circulating anode stream while passing through the upper part of the anode compartment, the electrolyte returns to the lower part of the anode at a higher temperature and the lower anode surface is maintained in an active condition.

When the cell is new, I reduce the dissipation of heat from the electrolyte in the upper part of the anode compartment and thus maintain the anode surface active without the use of an excessive intensity of flow of electric current. As the cell becomes older and less efficient, I lower the baffle 26, increasing the flow of electrolyte in space 30 and permitting more heat to escape from the circulating anode stream.

When the passages 23 through which the anode stream returns to the lower anode surfaces are obstructed because of exceptionally long interruptions in the flow of electric current or for other reasons, I find it advantageous to increase temporarily the flow of electric current in addition to preventing a dissipation of heat from the anode stream. As soon as the obstructions are melted away, I reduce the electric current to its normal value and rely upon the circulation of the anode stream to maintain the lower surface of the anode in active condition. Usually the addition of current is supplied by the auxiliary generator to only those cells which need it.

In the modified form of apparatus shown in Fig. 2, the conical partition 8 is covered or surrounded with a number of conical sections 40, 41, 42, 43 and 44, each formed of metal walls and filled with an insulating material such as diatomaceous earth. Each section has rings 45 for removing or placing them in position. Control of the dissipation of heat may be effected by the number of sections employed. All of the sections may be used for a minimum dissipation of heat and they may be removed as required for a greater dissipation of heat.

In the modified form of apparatus shown in Fig. 3, the thermal barrier or baffle 50 is similar to the baffle 26 of Fig. 1 and is employed in a similar manner. In this arrangement, the upper part of partition 8 contains a jacket 51 forming a space or duct 52 provided with an inlet pipe 53 and an outlet pipe 54 through which a circulating cooling medium, such as liquid sodium, may be used to transfer heat from the circulating stream of electrolyte in the upper part of the anode compartment to a heat interchanger (not shown) outside of the cell connected to pipes 53 and 54. The outflow of heat may be controlled by regulating the rate of circulation of the cooling medium and by the temperature of the cooling medium admitted to the duct. This arrangement may be used for superheating the electrolyte in the upper part of the anode compartment by transmitting heat from an interchanger (not shown) connected to pipes 53 and 54 by means of the circulating medium such as liquid sodium.

My improved apparatus for controlling the temperature of the anode stream affords the additional advantage of forcing more heat through the diaphragm into the cathode stream so that the rate of circulation of the cathode stream is materially increased facilitating the flow of replenished electrolyte to the cathode surface.

I claim:

1. A cell for the electrolysis of fused salt baths which comprises a cathode surrounding an anode, a diaphragm between the active surfaces of the cathode and the anode, a dome to receive collected gas, a partition above the diaphragm extending to the dome, an upper anode compartment above the active anode surface, within the partition and beneath the dome, a portion of the bath in the cell being outside the partition, said anode having a central opening therein connected with the upper anode compartment and having a plurality of openings connecting the central opening with the space between the diaphragm and the anode, a duct in heat-exchange contact with the bath in the upper anode compartment, and means for circulating a fluid in the duct to exchange heat with the bath in the anode compartment, whereby the temperature of the bath in the upper anode compartment may be controlled by adding or removing heat therefrom and the temperature of the bath returning to the central opening of the anode is controlled to maintain the active anode surface at normal activity.

2. In a cell for the electrolysis of fused salt baths the improvement which comprises a vessel for holding the fused bath, a cathode surrounding and spaced from a hollow anode, said anode having holes connecting the hollow interior thereof with the space between the cathode and anode, a perforated diaphragm between the active surfaces of cathode and anode, a hood above the cathode for collecting the metal, a dome above the upper surface of the bath for collecting gases liberated at the anode, a metal partition connecting the diaphragm with the dome forming an upper anode compartment between the top of the anode and the upper surface of the bath, the operation of said cell being characterized by an anode stream of fused bath circulating upward between the anode and diaphragm, then along the metal partition to the upper part of the anode compartment, then downward through the central part of the anode compartment into the hollow interior of the anode and through the holes in the anode into the space between the anode and diaphragm, a baffle in the bath spaced from the exterior of the partition and above the collecting hood, passage means for flowing a second stream of fused bath between the baffle and the partition, adjustable means for constricting or enlarging a part of the space through which the second stream flows to control the stream, thereby regulating the flow of heat through the partition and controlling the temperature of the anode stream under varying rates of heat generation in the anode stream.

3. An improved cell in accordance with claim 2 which comprises thermal insulation in the baffle for repressing the flow of heat through the baffle.

4. In a cell for the electrolysis of fuse salt baths the improvement which comprises a vessel for holding the fused bath, a cathode surrounding and spaced from a hollow anode, said anode having holes connecting the hollow interior thereof with the space between the cathode and anode, a perforated diaphragm between the active surfaces of cathode and anode, a hood above the cathode for collecting the metal, a dome above the upper surface of the bath for collecting gases liberated at the anode, a metal partition connecting the diaphragm with the dome forming an upper anode compartment between the top of the anode and the upper surface of the bath, the operation of said cell being characterized by an anode stream of fused bath circulating upward between the anode and diaphragm, then along the metal partition to the upper part of the anode compartment, then downward through the central part of the anode compartment into the hollow interior of the anode and through the holes in the anode into the space between the anode and diaphragm, a plurality of separate sections of thermal insulation in contact with the exterior of the partition which are removable from contact section by section, thereby regulating the flow of heat through the partition between the anode stream and the fused bath outside of the partition and controlling the temperature of the anode stream under varying rates of heat generation in the anode stream.

ROBERT J. McNITT.

REFERENCES CITED

The following references are of record in the file of this patent:

UNITED STATES PATENTS

| Number | Name | Date |
|---|---|---|
| 541,465 | Vautin | June 25, 1895 |
| 542,057 | Hulin | July 2, 1895 |
| 641,438 | Darling | Jan. 16, 1900 |
| 732,616 | Burgess et al. | June 30, 1903 |
| 1,043,154 | Seward et al. | Nov. 5, 1912 |
| 1,323,936 | Weaver | Dec. 2, 1919 |
| 1,839,756 | Grebe et al. | Jan. 5, 1932 |
| 2,071,087 | Philipp | Feb. 16, 1937 |
| 2,111,264 | Gilbert | Mar. 15, 1938 |
| 2,197,443 | Hardy et al. | Mar. 19, 1940 |
| 2,315,443 | McNitt | Mar. 30, 1943 |
| 2,390,114 | McNitt | Dec. 4, 1945 |

FOREIGN PATENTS

| Number | Country | Date |
|---|---|---|
| 332,669 | Germany | Feb. 7, 1921 |